United States Patent [19]
Matsumoto et al.

[11] Patent Number: 4,985,288
[45] Date of Patent: Jan. 15, 1991

[54] RESONANT FREQUENCY CHARACTERISTIC TAG AND METHOD OF MANUFACTURING THE SAME

[75] Inventors: Takeshi Matsumoto, Kohza; Yuji Suzuki, Chigasaki; Masahiro Kumagai, Yokohama; Shinya Uchibori, Hiroshima, all of Japan

[73] Assignee: Tokai Metals Co., Ltd., Japan

[21] Appl. No.: 343,747

[22] Filed: Apr. 27, 1989

[30] Foreign Application Priority Data

Apr. 30, 1988 [JP] Japan ................................ 63-107952
Aug. 8, 1988 [JP] Japan ................................ 63-197769

[51] Int. Cl.[5] ................................................ B32B 3/00
[52] U.S. Cl. ........................................ 428/40; 428/76; 428/137; 428/209; 428/447; 428/448; 428/457; 428/480; 428/520; 428/901; 343/895; 540/572
[58] Field of Search ........................ 343/895; 540/572; 428/209, 480, 520, 457, 137, 447, 448, 901, 40, 76

[56] References Cited

U.S. PATENT DOCUMENTS 4,498,076 2/1985 Lichtblau ............................ 340/572
4,658,264 4/1987 Baker .................................. 540/572

FOREIGN PATENT DOCUMENTS 0316847 5/1989 European Pat. Off. .
1277791 4/1988 Japan .

*Primary Examiner*—Patrick J. Ryan
*Attorney, Agent, or Firm*—Oliff & Berridge

[57] ABSTRACT

A resonant frequency characteristic tag has a thin dielectric film made of a polymer such as polyethylene, and a pair of resonant frequency characteristic circuits each formed on each side of the thin dielectric film, made of a metal foil and having a particular resonant frequency, the two resonant frequency characteristic circuits have terminal sections short-circuited to one another. A release paper is applied by a pressure sensitive adhesive to the surface of one of the two resonant frequency characteristic circuits, and a through hole or opening(s) with a diameter in a range between 0.5 and 3 mm is formed at an electrode plate in a capacitor section of the circuit. The distance between the two electrode plates is adjusted to a predetermined dimension by heating and pressing a portion at the periphery of the through hole or opening(s) with a suitable tool.

29 Claims, 2 Drawing Sheets

RESONANT FREQUENCY CHARACTERISTIC TAG AND METHOD OF MANUFACTURING THE SAME

BACKGROUND OF THE INVENTION

1. Field of the Invention

The present invention relates to a resonant frequency characteristic tag, which is readily capable of dielectric breakdown of an electrically insulating thin film as a dielectric in a high output electric field to short-circuit electrodes on the both sides of the dielectric to destroy preliminarily provided resonant frequency characteristics, and a method of manufacturing the same.

2. Description of the Prior Art

In department stores, supermarkets and general retail shops, various commodity protection means are provided to safeguard commodities against shop-lifting or like theft. To confirm commodities present in a control area as such in an electric manner with electric sensors, each commodity is provided with a resonant frequency characteristic tag, which is made of a flexible material and is provided with a printed circuit having certain particular resonant frequency characteristics. The resonant frequency characteristic tag is applied by means of adhesive to the commodity, or it is suspended therefrom with a string-like member which can not be readily broken. The resonant frequency characteristic tag is designed such that it causes a sensor to produce an alarm sound or the like when it is resonant to a wave at a certain frequency generated from a sensor in an area controlled thereby. The alarm sound permits confirmation of the pertinent commodity and can protect it from theft. However, it is necessary that after purchase of the commodity the tag no longer senses the resonant frequency transmitted from the sensor in the controlled area. Accordingly, after the purchase the printed circuit has been destroyed by "breaking apart" the tag. Alternatively, a metal foil, for instance an aluminum foil, has been applied as an "electromagnetic shield" to the circuit surface of the tag. As a further alternative, the dielectric layer has been made very thin so that exposure of the tag to a high output electric field readily causes short-circuiting of two electrodes of resonant frequency circuit provided on opposite surfaces of the tag, and hence vanishment of the resonant frequency characteristics.

However, where the vanishment of the resonant frequency characteristic is caused unnaturally by, for example, destroying the printed circuit by breaking apart the tag or applying an aluminum foil or like metal foil to the tag, a great deal of man-hour is required for the operation to cause vanishment for each commodity. These unnatural means of causing vanishment, therefore, are not suited for causing vanishment of the resonant frequency characteristics of a great number of tags.

The method of causing ready short-circuit of the printed circuit electrodes by mechanically reducing the thin film of dielectric has a different problem. In this case, the printed circuit is squeezed together with the material of the tag in the thickness direction thereof. Therefore, unless the individual components of the tag have fixed thickness, dielectric breakdown fails to occur in cases when the thickness of the dielectric film is increased.

SUMMARY OF THE INVENTION

The present invention is intended to solve the above problems by the provision of a resonant frequency characteristic tag, which permits the dielectric breakdown of dielectric and short-circuit of electrodes to be effected readily and reliably, and a method of manufacturing the same resonant frequency characteristic tag.

More specifically, an object of the present invention is to provide a resonant frequency characteristic tag, which permits dielectric breakdown of dielectric and short-circuit of electrodes to be effected readily and reliably.

Another object of the present invention is to provide a method for readily manufacturing the resonant frequency characteristic tag, which permits dielectric breakdown of dielectric and short-circuit of electrodes to be done readily and reliably.

According to the present invention, there are provided a resonant frequency characteristic tag, which comprises a dielectric which is a film made of polymer such as polyethylene, a pair of resonant frequency characteristic circuits each formed on each side of the thin dielectric film, made of metal foil such as an aluminum foil and having a particular resonant frequency, the two resonant frequency characteristic circuits having terminal sections short-circuited to one another to form a resonant frequency characteristic sheet, a release paper such as silicone coated paper applied by adhesive to the surface of one of the two resonant frequency characteristic circuits, a through hole being formed through an electrode plate in a capacitor section in the surface of the circuit on the side of the release paper such that it reaches an electrode plate in a capacitor section in the surface of the other circuit or an opening in the capacitor section electrode plates of at least one of the resonant frequency characteristic circuits of the resonant frequency characteristic sheet such that it reaches the thin dielectric film, the distance between the two capacitor section electrode plates being adjusted to a predetermined dimension by heating and pressing a portion surrounding the through hole or the opening inclusive thereof with a suitable tool, and a method of manufacturing the same.

DETAILED DESCRIPTION OF THE PREFERRED EMBODIMENTS

Figure 1:
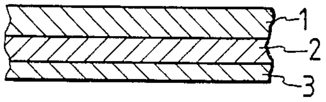
FIGS. 1 to 6 are views for explaining one embodiment of the present invention and are schematic sectional views showing members laminated in individual steps.

According to the present invention, the resonant frequency characteristic tag is manufactured by a method, which comprises the steps of forming a pair of resonant frequency characteristic circuits having a particular resonant frequency each formed on each side of a dielectric which is a film made of polymer such as polyethylene (hereinafter referred to as thin dielectric film of polymer) by laminating a metal foil such as an aluminum foil on each side, printing a printed circuit pattern on the metal foil by a gravure or like printing process and carrying out chemical etching treatment, causing short-circuit between terminal sections made of metal foils at the both sides to form a resonant frequency characteristic sheet, (1) applying a release paper such as silicone coated paper to one of the two circuits on the resonant frequency characteristic sheet by using a pressure sensitive adhesive, forming a through hole with a diameter in a range of 0.5 to 3 mm through an electrode plate of a capacitor section in the surface of the circuit on the side of the release paper such that it reaches an electrode plate of a capacitor section in the surface of the other circuit, adjusting the distance between the two electrode plates to a predetermined dimension by pressing a portion of the other circuit capacitor section electrode plate corresponding to the periphery of the through hole inclusive of the through hole with a tool heated to a temperature, for instance, in a range of 200° to 250° C., applying a paper such as woodfree paper to the side of the dielectric opposite the release paper by using an adhesive, and then cutting thus prepared resonant frequency characteristic sheet to a predetermine size to obtain the intended tag, or (2) printing an etching-resist ink on one or each of the capacitor section electrode plates of the resonant frequency characteristic sheet such that a resonant frequency characteristic circuit having a particular resonant frequency is formed by a gravure or like printing process and a circular opening with a diameter in a range of 0.5 to 3 mm is formed in one of electrode plates of capacitor sections of the two circuits or each of the electrode plate such that the two openings overlap and carrying out chemical etching treatment. thus forming the circuits and opening(s), applying a release paper such as silicone coated paper to the side of one of the two circuits by using an pressure sensitive adhesive, adjusting the distance between the two electrodes to a predetermined dimension by urging a portion of the capacitor section electrode plate of the other circuit in the periphery of the opening inclusive of the opening with a tool heated to a surface temperature, for example, in a range of 200° to 250° C., applying a paper such as woodfree paper to the side of the dielectric opposite the release paper by using adhesive, and cutting thus prepared resonant frequency characteristic sheet to a predetermined size to obtain the intended tag.

To permit ready short-circuit between the two capacitor section electrodes of this resonant frequency characteristic tag in a high output electric field, it is necessary to maintain the distance between the two metal foils of the both electrodes to be 0.0003 mm or below. In one method according to the present invention, the distance of 0.0003 mm or below is obtained by forming a through hole of 0.3 to 3 mm, preferably 0.5 to 3 mm in diameter from one circuit made of a metal foil having 50 $\mu$ (micron) in thickness such that it reaches the capacitor section electrode plate of the other circuit. When forming the through hole, to obtain a stable distance it is preferred to apply a release paper such as silicone coated paper to the surface of the metal foil by using a pressure sensitive adhesive and then form the through hole from the surface of the release paper rather than forming the hole directly through the metal foil. If a through hole is formed directly through the metal foil, burrs are formed around the hole to cause contact of the two metal foils, thus frequently producing short-circuit. In this case, a stable distance between the two metal foils of electrode as intended in accordance with the present invention can not be obtained. Further, if a through hole is formed in a metal foil of 0.006 to 0.010 mm in diameter used as the capacitor section electrode plate, or if a through hole is formed in a paper such as woodfree paper applied to the metal foil, burrs of metal foil formed around the hole causes contact between the two metal foils, thus producing short-circuit. Therefore, these cases can not meet the purpose of the present invention.

In another method of providing a predetermined gap between the two electrode metal foils according to the present invention, the capacitor section electrode plate of at least one of the two circuits is formed with an opening having a predetermined size and reaching the dielectric. A portion of the electrode plate including the opening is urged with a heated tool to adjust the thickness of the dielectric film between the two electrode plates in the neighborhood of the hole to a predetermined value.

The size of the opening provided in the capacitor section electrode plate varies with the thicknesses of the dielectric film and metal foils, but usually a circular opening with a diameter of 0.3 to 3 mm, preferably 0.3 to 2 mm, is desired. However, the opening is provided to facilitate flow of the polymer as dielectric between the electrode plates at the time of heating and pressure application. Thus, the opening needs not be circular but may have any other desired shape. In addition, it is possible to provide more than one opening. This means that an opening may be provided in each of the two circuit capacitor section electrode plates. In this case, it is desired that the opposite side openings substantially overlap each other, and one of them is greater in size than the other. Where an opening is formed in only a single side electrode plate, it is advantageously formed in an electrode plate made of a thicker metal foil.

Heating and pressure application are effected by urging the surface of the metal foil applied to the dielectriC surface in the periphery of the opening with a heated tool.

This operation may be performed with circuits formed on the surfaces of the thin dielectric film of polymer, or it may be performed after laminating paper or the like onto the surface of one of the circuits. Application of paper to one surface usually improves the handling. In this case, heating and pressure application are effected from the metal foil surface side. It is recommended to apply a release paper such as silicone coated paper to one side by using an adhesive such as a pressure sensitive adhesive.

The conditions of heating and pressure application vary with the kind of polymer as dielectric. However, in case of thermoplastic polymer such as polyethylene a tool heated to a surface temperature of 200° to 250° C. is suitably used for urging. Where the size of the opening is 0.3 to 3 mm, a circular tool with a tip diameter of 3 to 5 mm and having a pointed shape to permit effective contact is used for urging to obtain a predetermined inter-electrode gap. Where an aluminum or like metal foil in the periphery of the opening inclusive of the opening is urged with a heated tool, applied heat can cause melting and shrinkage of a thin dielectric film of polymer between ends of the metal foils such as an aluminum foil on the opposite sides of the opening. Thus, it is possible to obtain a very thin film of 0.0003 mm or below in thickness, thus obtaining an inter-electrode distance capable of dielectric breakdown. The limitation of the diameter of the circular opening to 0.3 to 3 mm in the usual case is due to two reasons. That is, the lower limit of 0.3 mm is set in view of the limit of printing in the printing method at the time of mass production. The upper limit of 3 mm is set due to the limits of adjustment in the resonant frequency design in electric properties. The limitation of the diameter of the end of the heated circular tool capable of effective contact to 3 to 5 mm is due to the following reasons. The lower limit of 3 mm is set due to a reason that when the diameter of the tool is 3 mm and diameter the opening is 3 mm, there is a possibility due to accuracy of production equipment used that the thin dielectric film of polymer such as polyethylene present at the opening is melted and destroyed. The upper limit of 5 mm is set for the following reason. In a case that a metal foil to be used is aluminum foil, due to its good heat-conductivity a diameter more than 5 mm results in deteriorating the heat concentration effect, so that the thin dielectric film of polymer is not thermally melted uniformly. This means that a stable distance capable of dielectric breakdown can no longer be obtained between the electrode plates.

According to the present invention, the dielectric may be such plastic film as polyethylene, polypropylene and polyester. From the standpoint of cost and processibility, however, polyolefins such as polyethylene and polypropylene are preferred. The dielectric film is preferably as thin as possible, and its thickness is determined from the limitations in manufacture. According to the present invention, it is sufficient if the thickness is 30μ or below.

According to the present invention there is no particular limitation on the metal foil. However, aluminum foil is preferred from the standpoint of cost and processiblity. The thickness of the foil may be in a range usually adopted for the pertaining purpose. Typically, it is about 50μ on the side of the resonant frequency characteristic circuit and about 10μ on the other side.

As means for forming the through hole of 0.3 to 3 mm in diameter through the capacitor section electrode plate in the circuit surface from the side of the release paper such that it reaches the capacitor section electrode plate in the other circuit surface, a needle which is as thick as noted above may be used. Alternatively, a hollow punch or like tool may be used when forming a through hole of about 3 mm in diameter.

The release paper may be made of plastic film. However, for forming a hole, it is advantageously to be made of paper. Its thickness is not particularly limited. Preferably, the thickness is selected such that the components of the tag can be readily handled when forming the through hole and a hole having a predetermined size can be reliably formed.

The pressure sensitive adhesive is used to secure the release paper when forming a through hole and also attach the tag to a commodity or the like. The adhesive presumably has a role of preventing direct contact of burrs of the electrode metal foils by intervening between adjacent burrs. Usually, it is coated to a thickness of 40 to 80μ.

In the method of providing an opening only in metal foil, after printing the metal foils are chemically etched to form both circuits and opening. Then, the circuit terminal sections of the metal foils are short-circuited, and a release paper such as silicone coated paper is applied to the side of one circuit by using an adhesive. As the release paper may be selected one which has a quality and a thickness such that it provides effective release property with respect to any adhesive used and provides effective buffering property when urged with a heated tool. The adhesive used should have such adhesion force that it will not be readily separated even by external force for a certain fixed period of time from various glass products, polyethylene, polypropylene, polyester and other plastic films or products with coating of plastics used in a temperature range from a low temperature of −20° C. to a high temperature of 40° C. even when external forces are applied.

To the resonant frequency characteristic tag, a paper such as woodfree paper with an impression is laminated by an ordinary manner by using an adhesive.

EXAMPLES

Now, examples of the present invention will be described with reference to the drawings without any sense of limitation.

EXAMPLE 1

A resonant frequency characteristic tag is manufactured from a base as shown in FIG. 1, consisting of a dielectric film 2 and metal foils 1 and 3 such as a aluminum foil laminated by means of extrusion or thermal press on both sides of the film 2. The dielectric film 2 made of a polyolefin such as polyethylene. It has a thickness of 0.03 mm or below and has as small electromagnetic or "dielectric tangent" value.

Where aluminum foil is used as the metal foil, the aluminum purity is desirably in a range of 99.0 to 99.7% in view of electric properties, fitness of processing such as application and etching operations and further physical properties of the product.

Of the two metal foils applied to the opposite sides of the dielectric film 2 of polyethylene or the like, one, namely metal foil 1, is used as LCR circuit or terminal section of circuit, and in case of aluminum foil the thickness thereof is desirably in a range of 0.050 or 0.060 mm. The opposite side metal foil 3 is used as a capacitor electrode plate 13 and a circuit terminal section 5, and in case of aluminum foil, the thickness thereof is in a range of 0.006 to 0.010 mm.

Figure 2:
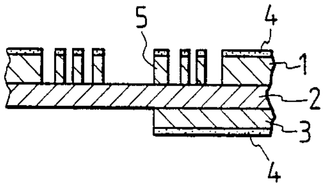

To obtain a particular resonant frequency, a resonant frequency characteristic circuit is printed on each side of the base. i.e., on each metal foil, by a printing process, e.g., gravure printing, silk screen printing, flexo printing and relief rotary printing, using an ink 4 having an etching-resist property (FIG. 2). Subsequently, the metal foils 1 and 3 are chemically etched by using a chemical, e.g., acid or alkali, thus forming an eventual resonant frequency circuit as shown in FIG. 2.

Figure 3:
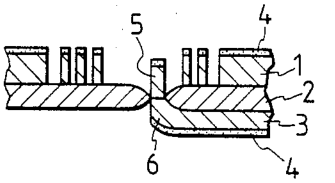

Subsequent to the etching process, circuit terminal sections 5 and 6 of the metal foils 1 and 3 on the both sides of the dielectric film 2 of polyethylene or the like are short-circuited to each other as shown in FIG. 3 by a mechanical operation of destroying and crushing the film using a special tool, thus completing a resonant circuit.

Figure 4:
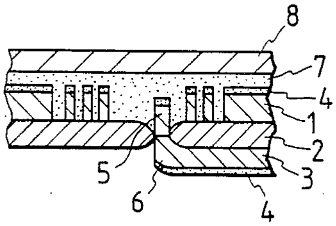

Afterwards, a pressure sensitive adhesive 7 having sufficient adhesion with respect to paper, polymer films, glass bottles, etc. is applied to the surface of circuit I (i.e., metal foil 1), and a release paper 8 such as silicone coated paper is applied to the adhesive 7 (FIG. 4).

Figure 5:
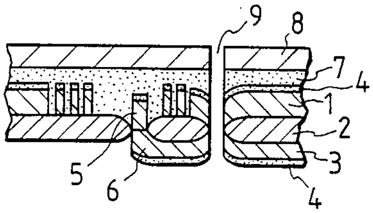

In order to be able to readily obtain short-circuit between the metal foils 1 and 3 as both electrodes with dielectric breakdown of the dielectric film 2 of polyethylene or the like in a high output electric field, it is necessary to maintain the gap between the opposite electrode metal foils to be 0.0003 mm or below. To obtain a fixed inter-electrode gap of 0.0003 mm or below, after etching, a through hole 9 with a diameter in a range of 0.5 to 3 mm is formed in the electrode plate of the capacitor section of circuit I (i.e., metal foil 1) from the side of the release paper 8 applied to the surface of the circuit I using a punching tool such that it reaches the electrode plate of the capacitor section of the other circuit II (i.e., metal foil 3). (see FIG. 5) In order to prevent the gap between the electrodes (i.e., metal foils and 3) from expanding to be above 0.0003 mm when removing the punching tool from the through hole 9 after formation thereof, a portion of the electrode plate of the capacitor section of the other metal foil 3 in the periphery of the through hole inclusive of the through hole is urged with a circular flat tool with a diameter of 4 to 6 mm and heated to a surface temperature of 200° to 250° C.

Figure 6:
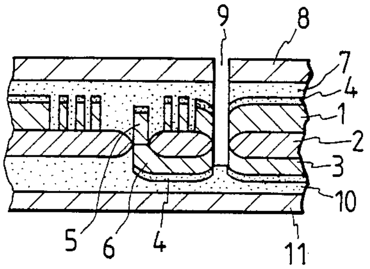
Figure 7:
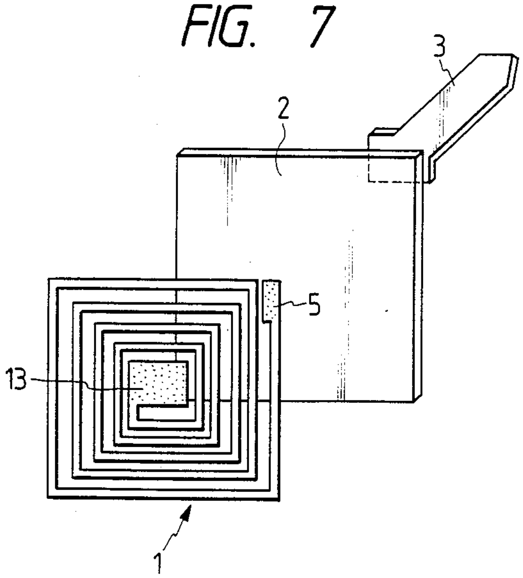
FIG. 7 is an exploded perspective view showing an example of the resonant frequency characteristic tag.
Figure 8:
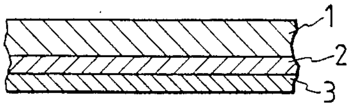
FIGS. 8 to 13 are views for explaining a different embodiment of the present invention and are schematic sectional views showing members laminated in individual steps.
Figure 9:
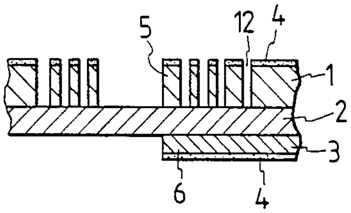
Figure 10:
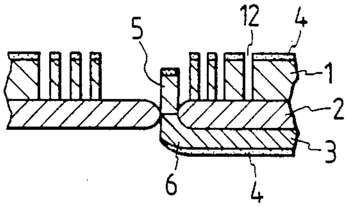
Figure 11:
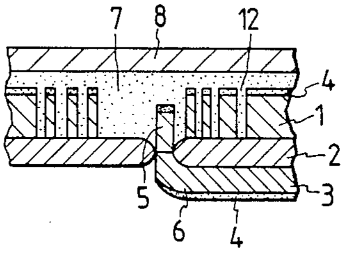

By so doing, it is possible to maintain a fixed inter-electrode gap of 0.003 mm or below capable of electric breakdown. After urging the portion in the periphery of the through hole 9 inclusive of the through hole, a paper 11 such as woodfree paper is laminated to the side opposite the release paper 8 by using an adhesive 10, as shown in FIG. 6. Thereafter, the prepared resonant frequency characteristic sheet is cut to a predetermined size, thus completing the tag. The paper 11 such as woodfree paper is of course provided with an impression.

EXAMPLE 2

A resonant frequency characteristic sheet with a release paper 8 on one side is obtained through steps shown in FIGS. 8 to 11, that is, in the same manner as in Example 1 except for that an opening 12 is formed in the metal foil 1 on one side simultaneously with the formation of the resonant frequency characteristic circuit by application of etching-resist ink 4 to the metal foils 1 and 3 and etching the foils.

Figure 12:
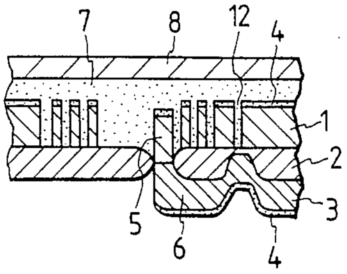
Figure 13:
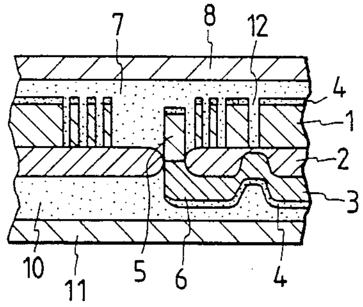

Then, to obtain a predetermined inter-electrode gap a portion of the electrode plate of the capacitor section of the circuit I (i.e., metal foil 1) formed by etching is urged from the side of the electrode plate of the capacitor section of the other circuit II (i.e., metal foil 3) using a circuit tool with a tip diameter of 2 to 5 mm capable of effective contact and heated to a surface temperature of 200° to 250° C., as shown in FIG. 12. With the heating and pressure application, the dielectric film 2 of polyethylene or like polymer between the metal foils 1 and 3 in the periphery of the opening 12 inclusive of the opening undergoes melting and shrinkage to form a very thin film portion with a thickness of 0.0003 mm or below. In this way, it is possible to obtain an inter-electrode gap capable of dielectric breakdown. Afterwards, as shown in FIG. 13, a paper 11 such as a woodfree paper is applied to the side opposite the release paper 8 by using the adhesive 10, and then thus prepared resonant frequency characteristic sheet is cut to a predetermined size to complete the tag. The paper 11 such as woodfree paper is of course provided with an impression.

As has been described in the foregoing, according to the present invention a release paper is applied to one side of the base via a pressure sensitive adhesive, and a through ho)e is formed from the release paper. Thus, it is possible to form a through hole having a fixed size and free from size fluctuations. In addition, according to the present invention, the distance between the metal foils laminated to the opposite sides of the dielectric film is adjusted with metal foil burrs formed when forming the through hole. Thus, a through hole free from size fluctuation can be formed to obtain a filed dielectric breakdown performance which never fluctuates with gas. According to the present invention, it is possible to obtain a tag, which is readily capable of dielectric breakdown even with a thick dielectric film.

Further, according to the present invention, the periphery of the opening(s) inclusive of the opening(s) provided in the capacitor electrode plate(s) in the one of or both circuits is urged by a tool heated from the side of the circuit II (i.e., metal foil 3), causing melting and shrinkage of the dielectric film 2 of polyethylene or like polymer present between the metal foils 1 and 3. Thus, it is possible to obtain a very stable inter-electrode distance compared to the case where a very thin film of 0.0003 mm or below capable of dielectric breakdown is produced by applying an external mechanical force.

What is claimed is:

1. A resonant frequency characteristic tag comprising:

a thin dielectric film comprising a polymer, a pair of resonant frequency characteristic circuits each formed on a respective side of said thin dielectric film, made of a metal foil and having a particular resonant frequency, said two resonant frequency characteristic circuits having terminal sections short-circuited to one another, a release paper applied by a pressure sensitive adhesive to the surface of one of said two resonant frequency characteristic circuits, and a through hole with a diameter in a range between 0.5 mm and 3 mm being formed through an electrode plate in a capacitor section in the surface of said one circuit to which said release paper is applied such that it reaches an electrode plate in a capacitor section in the surface of the other circuit, the distance between said two electrode plates being thus adjusted to a predetermined distance of 0.0003 mm or less at a portion at the periphery of said through hole.

2. A resonant frequency characteristic tag as claimed in claim 1, wherein said polymer is polyethylene.

3. A resonant frequency characteristic tag as claimed in claim 1, wherein said metal foil is aluminum foil.

4. A resonant frequency characteristic tag as claimed in claim 1, wherein said release paper is a silicone coated paper.

5. A resonant frequency characteristic tag, comprising a thin dielectric film comprising a polymer, a pair of resonant frequency characteristic circuits having a predetermined resonant frequency provided on respective sides of said dielectric film and made of metal foil, said pair of resonant frequency characteristic circuits having terminal sections short-circuited to one another, each of said pair of resonant frequency characteristic circuits including a capacitor section having an electrode plate, at least one of said electrode plates being formed with an opening reaching said dielectric film, the distance between the two electrode plates of said two circuits being adjusted to a predetermined distance of 0.0003 mm or less at a portion including said opening.

6. A resonant frequency characteristic tag as claimed in claim 5, wherein said opening formed in at least one electrode plate is circular in shape and with a diameter in a range of 0.3 mm to 2 mm.

7. A resonant frequency characteristic tag as claimed in claim 5, wherein an opening is formed in the electrode plate on each side of said dielectric film in substantial alignment with each other.

8. A resonant frequency characteristic tag as claimed in claim 5, wherein a release paper is applied to the side of one of said pair of circuits with a pressure sensitive adhesive, the distance between the capacitor section electrode plates in the two circuits is adjusted to the predetermined distance at the periphery of the opening inclusive of an opening in the electrode plate of the other circuit, and a paper is applied to the side of said dielectric opposite side release paper with a pressure sensitive adhesive.

9. A resonant frequency characteristic tag as claimed in claim 5, wherein said polymer is polyethylene.

10. A resonant frequency characteristic tag as claimed in claim 5, wherein said metal foil is aluminum foil.

11. A resonant frequency characteristic tag as claimed in claim 8, wherein said release paper is a silicone coated paper.

12. A resonant frequency characteristic tag as claimed in claim 8, wherein the paper applied to the side of the dielectric opposite the release paper is a woodfree paper.

13. A method of manufacturing a resonant frequency characteristic tag comprising the steps of:

forming a pair of resonant frequency characteristic circuits having a particular resonant frequency on respective sides of a thin dielectric film comprising a polymer by laminating a metal foil on each respective side and printing a printed circuit pattern on said metal foil of each respective side, causing a short-circuit between terminal sections of said two resonant frequency characteristic circuits on said respective sides of said dielectric film, applying a release paper to one of said two circuits using a pressure sensitive adhesive, forming a through hole with a diameter in a range between 0.5 mm and 3 mm through an electrode plate in a capacitor section in the surface of said one circuit to which said release paper is applied such that it reaches an electrode plate of a capacitor section in the surface of the other circuit, and adjusting the distance between said two electrode plates to a predetermined distance of 0.0005 mm or less by heating and pressing a portion at the periphery of said through hole with a suitable tool.

14. A method according to claim 13, wherein said polymer is polyethylene.

15. A method according to claim 13, wherein said metal foil is aluminum foil.

16. A method according to claim 13, wherein said release paper is a silicone coated paper.

17. A method of manufacturing a resonant frequency characteristic tag, comprising the steps of:

forming a pair of resonant frequency characteristic circuits having a particular resonant frequency on respective sides of a thin dielectric film comprising a polymer, by laminating a metal foil on each respective side, printing a printed circuit pattern on said metal foil on each respective side and carrying out a chemical etching treatment, causing a short-circuit between terminal sections of the metal foils on said respective sides, applying a release paper to one of said two circuits using a pressure sensitive adhesive, forming a through hole with a diameter in a range of 0.5 mm to 3 mm through an electrode plate of a capacitor section in the surface of said one circuit to which said release paper is applied such that it reaches an electrode plate of a capacitor section in the surface of the other circuit, adjusting the distance between said two electrode plates to a predetermined distance of 0.0003 mm or less by pressing a portion of the electrode plate of said other circuit corresponding to the periphery of said through hole with a tool heated to a temperature in a range of 200° to 250° C., applying a paper to the side of said dielectric opposite said release paper using an adhesive, and then cutting the thus prepared resonant frequency characteristic sheet to a predetermined size to obtain the resonant frequency characteristic tag.

18. A method according to claim 17, wherein said polymer is polyethylene.

19. A method according to claim 17, wherein said metal foil is aluminum foil.

20. A method according to claim 17, wherein said release paper is a silicone coated paper.

21. A method according to claim 17, wherein the printed circuit patterns are printed using a gravure printing process.

22. A method according to claim 17, wherein the paper applied to the side of the dielectric opposite the release paper is a woodfree paper.

23. A method of manufacturing a resonant frequency characteristic tag, comprising the steps of forming a pair of resonant frequency characteristic circuits having a particular resonant frequency on respective sides of a thin dielectric film comprising a polymer together with a hole for providing a short-circuit between said two circuits, by applying a metal foil on each respective side, printing an etching-resist ink on the metal foil of each side such that a printed circuit is formed on each side with a capacitor section having an electrode plate, forming a circular opening with a diameter in a range of 0.3 mm to 2 mm in the electrode plate of one of said two circuits such that the opening overlaps with a portion of the electrode plate in the other circuit, and carrying out a chemical etching treatment, causing a short-circuit between terminal sections of both said metal foils, applying a release paper to said one of said two circuits using a pressure sensitive adhesive, adjusting the distance between said two electrodes to a predetermined distance of 0.0003 mm or less by urging a portion of the electrode plate of the other circuit in the periphery of the opening inclusive of the opening toward said opening with a tool heated to a surface temperature in a range of 200° to 250° C., applying a paper to the side of said dielectric opposite said release paper using an adhesive, and cutting the thus prepared resonant frequency characteristic sheet to a predetermined size to obtain the resonant frequency characteristic tag.

24. A method according to claim 23, wherein said polymer is polyethylene.

25. A method according to claim 23, wherein said metal foil is aluminum foil.

26. A method according to claim 23, wherein said release paper is a silicone coated paper.

27. A method according to claim 23, wherein the printed circuit patterns are printed using a gravure printing process.

28. A method according to claim 23, wherein the paper applied to the side of the dielectric opposite the release paper is a woodfree paper.

29. A method according to claim 23, wherein a circular opening is also provided in the electrode plate of said other circuit, such that the two openings overlap.

* * * * *